(12) United States Patent
Zalm et al.

(10) Patent No.: US 7,703,598 B2
(45) Date of Patent: Apr. 27, 2010

(54) DISTRIBUTING DEVICE FOR CLOSURES

(75) Inventors: Arie Zalm, Enkhuizen (NL); Johannes Cornelis Hansen, Volendam (NL)

(73) Assignee: Stork Food & Dairy Systems B.V., Amsterdam (NL)

(*) Notice: Subject to any disclaimer, the term of this patent is extended or adjusted under 35 U.S.C. 154(b) by 901 days.

(21) Appl. No.: 11/113,887

(22) Filed: Apr. 25, 2005

(65) Prior Publication Data
US 2005/0252927 A1 Nov. 17, 2005

(30) Foreign Application Priority Data
Apr. 28, 2004 (NL) .................................... 1026070

(51) Int. Cl.
B65G 47/68 (2006.01)
B65G 43/00 (2006.01)
B65G 47/10 (2006.01)
B65G 47/00 (2006.01)

(52) U.S. Cl. .................... 198/436; 198/437; 198/442; 198/369.5; 198/532

(58) Field of Classification Search ................ 198/436, 198/437, 442, 369.5, 532; 221/40, 68, 171
See application file for complete search history.

(56) References Cited

U.S. PATENT DOCUMENTS

| | | | | |
|---|---|---|---|---|
| 3,895,716 A * | 7/1975 | Ugo | ........................ | 209/564 |
| 4,312,172 A * | 1/1982 | Fisher et al. | ................. | 53/489 |
| 5,186,306 A * | 2/1993 | Sjostrand | .................... | 198/442 |
| 6,463,713 B1 * | 10/2002 | Ruemeli | ....................... | 53/52 |

FOREIGN PATENT DOCUMENTS

| | | | |
|---|---|---|---|
| FR | 2596311 | | 10/1987 |
| FR | 2596311 A1 | * | 10/1987 |
| GB | 1360230 | | 7/1974 |
| GB | 1360230 A | * | 7/1974 |
| JP | 60228035 | | 11/1985 |
| JP | 61150919 | | 7/1986 |

OTHER PUBLICATIONS

English Abstract of FR 2596311.
English Abstract of JP 61150919.
English Abstract of JP 60228035.

* cited by examiner

*Primary Examiner*—Gene Crawford
*Assistant Examiner*—Yolanda Cumbess
(74) *Attorney, Agent, or Firm*—Hoffman & Baron, LLP

(57) ABSTRACT

A distributing device for distributing closures, supplied from a supply line with outlet, over a plurality of manufacturing lines, each manufacturing line comprising a feed-in, comprises a distributing element, which distributing element comprises at least a number of guideways conforming to the number of manufacturing lines, each guideway comprising an entrance for the positioning of the guideway relative to the outlet of the supply line, an exit for the positioning of the guideway relative to the feed-in of the particular manufacturing line, and a passage connecting the entrance to the exit, as well as a displacement mechanism for the simultaneous positioning of an entrance of a specific guideway of the distributing element in line with the outlet of the supply line and, respectively, of an exit of the specific guideway in line with the feed-in of a manufacturing line, the entrances of the guideways being disposed in a direction perpendicular to the longitudinal plane of the supply line.

9 Claims, 3 Drawing Sheets

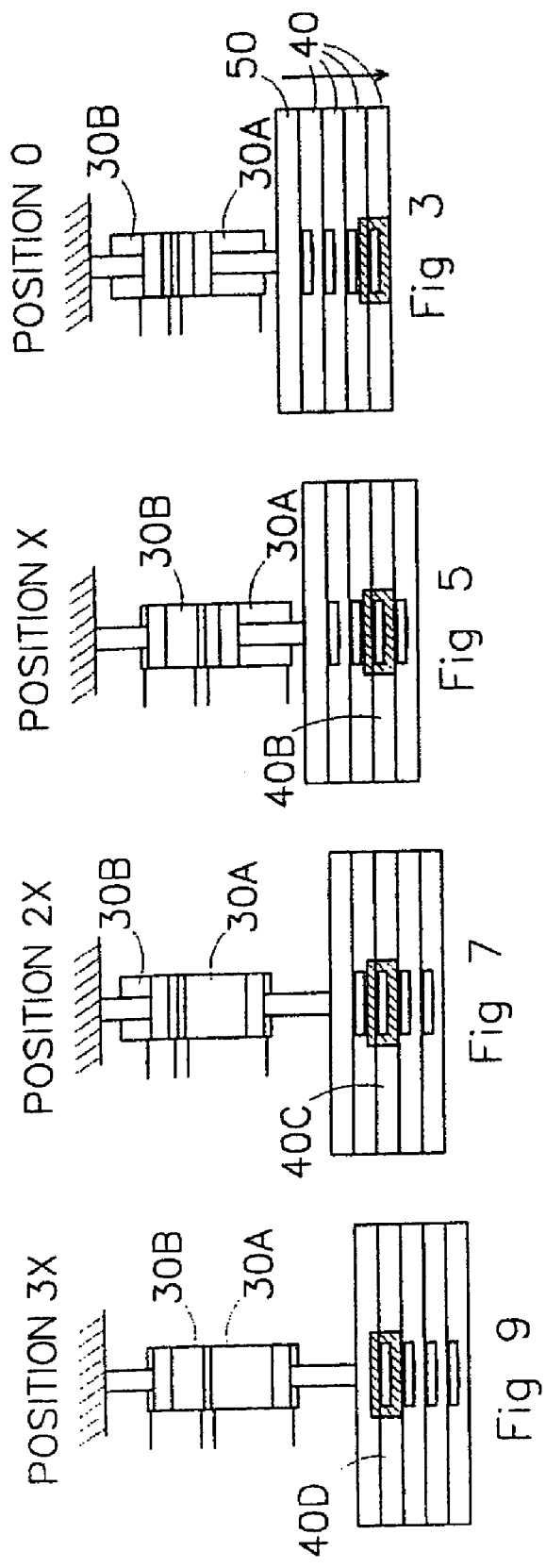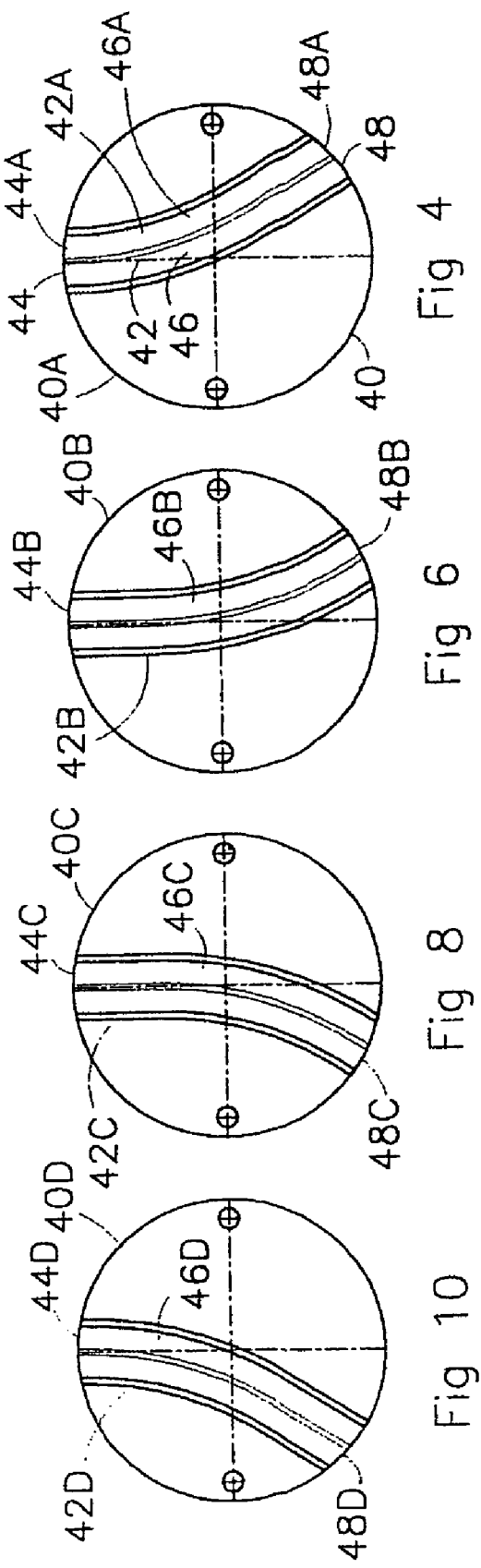

DISTRIBUTING DEVICE FOR CLOSURES

CROSS-REFERENCE TO RELATED APPLICATIONS

This application which claims the benefit of Netherlands Application No. NL 1026070, filed Apr. 28, 2004, the contents of which is incorporated by reference herein.

FIELD OF THE INVENTION

The present invention relates to a distributing device for distributing closures, supplied from a supply line with outlet, over a plurality of manufacturing lines, each manufacturing line comprising a feed-in.

BACKGROUND OF THE INVENTION

A distributing device of this type is known, for example, from British patent number 1360230.

Closures such as lids and caps for containers such as bottles and jars, for example made of aluminium, etc., are generally punched from a band or strip in a press, after which the punched-out closures, possibly with pull lip, are fed via a supply line to (aseptic) filling devices in which containers, such as bottles, jars, cans, etc., filled with free-flowing products, especially fluid food products with a limited shelf life, are closed off with the supplied closures. The closure may or may not be sterilized beforehand. Based on economic considerations, it is favourable to produce the closures on one press and then guide them, via a supply line, in the direction of the filling device. A filling device generally comprises a plurality of parallel filling lines, each with its own filling bay. In a filling line, containers are fed to the particular filling bay, then filled with the product to be dispensed and afterwards closed off with the closures. This means that, from one supply line, the closures are distributed over the different filling lines with the aid of a distributing device.

In the case of the distributing device known from the aforementioned British patent specification, the closures are supplied via a main chute, which is disposed obliquely relative to the horizontal plane. The main chute comprises, in the bottommost portion thereof, supporting means, on which the closures rest. These supporting means are located above pass-through openings in the bottom of the main chute, which pass-through openings are arranged above the top ends of a number of manufacturing lines. These manufacturing lines adjoin the filling bays, where the closures are fitted onto filled containers. The supporting means are movably disposed. By allowing the supporting means to move, either simultaneously for the simultaneous filling of all manufacturing lines or separately for the filling of one manufacturing line, a closure falls in the particular position out of the main chute through the pass-through opening into the particular manufacturing line.

A drawback of this known device is that when the last manufacturing line, which is fed via the last (or bottommost) pass-through opening of the main chute, has to be operated, the closures need to cover a relatively large distance, with the result that the capacity of this known distributing device for the manufacture of closures is low. Moreover, the supporting means are rotatably disposed. In this technical field, however, rotation motions are undesirable.

JP-A-60228035 discloses a feed device for supplying (component) parts to a receiving device, the parts being distributed from a supply line over two manufacturing lines with the aid of a distributing valve. The distributing valve can be moved to and fro in the longitudinal plane of the lines with the aid of a displacement mechanism. Furthermore, this valve is provided with a pair of guideways, each with its own entrance and exit, which are mutually connected by means of a passage. This passage may only contain one (component) part. During operation, there is no direct passage from the outlet of the supply line, via the entrance, passage and exit of the valve, to the feed-in of the manufacturing line. This device is relatively slow and not suitable for use as a device for distributing closures over a plurality of filling lines.

JP-A-61150919 discloses a similar feed device, in which a valve, which can likewise be moved to and fro in the longitudinal plane of the lines, is used. This valve comprises a pair of guideways, each with its own entrance and exit, which are mutually connected by means of a passage. The guideway is shaped such that, during operation, a direct feed-through is possible from the supply line to the particular manufacturing line.

From FR-A-2596311, furthermore, a distributing device is known in which a rotary disc is used. The rotary disc is provided with guideways, each with its own entrance and exit, which are mutually connected by means of a passage. Rotary components are undesirable, however, in the use of a distributing device in filling lines, owing to relatively significant wear, accompanying maintenance and susceptibility to breakdowns.

According to yet another prior art which is known within the trade, rotatable "flippers" are used, which are disposed at the end of the supply line to distribute the delivered closures over the manufacturing lines. The rotatability of such flippers is undesirable. Owing to the required positioning accuracy, it is not generally possible, moreover, to operate more than two manufacturing lines using one set of such flippers.

SUMMARY OF THE INVENTION

The object of the present invention is to provide a high-capacity distributing device for distributing closures, supplied from a supply line with outlet, over a plurality of manufacturing lines.

Another object is to provide a device of this type, in which no rotatable components are used for the distribution.

The distributing device according to the invention of the sort described in the preamble comprises a distributing element comprising a number of guideways conforming at least to the number of manufacturing lines, each guideway comprising an entrance for the introduction of closures into the guideway, an exit for the discharge of closures out of the guideway into the feed-in of the particular manufacturing line, and a passage connecting the entrance to the exit, as well as a displacement mechanism for the simultaneous positioning of an entrance of a specific guideway of the distributing element in line with the outlet of the supply line and, respectively, of the exit of the specific guideway in line with the feed-in of a manufacturing line, the entrances of the guideways being disposed in a direction perpendicular to the longitudinal plane of the supply line.

In the distributing device according to the invention, the closures are distributed over the manufacturing lines with the aid of a movably disposed distributing element, the feed-ins of the manufacturing lines generally being disposed side by side in the same plane. In this application, this is referred to as the longitudinal plane. The distributing element comprises guideways, the number of which is at least equal to the number of manufacturing lines to be operated. The number of guideways is preferably equal to the number of manufacturing lines, but can also be a whole number of times this number, and even a fractional number of times subject to this being >1, for example where not each manufacturing line has the same capacity. In the preferred case, however, the regulation of the number of closures fed through in the particular guideways is simpler. In the following discussion, it is always assumed that there is a guideway present for each manufacturing line.

The distributing device according to the invention can be used both in distribution systems of supply line and manufacturing lines, which distribution systems are situated in a horizontal plane, and in distribution systems which are situated in a virtually vertical plane. In horizontal systems, a drive medium, such as a forced flow of air, is necessary for the displacement of the closures. In vertical systems, the closures move under the influence of gravity. For this reason, the latter systems are preferable.

Each guideway comprises an entrance, into which the closures delivered from the outlet of the supply line are introduced, a passage and an exit, from which the closures are fed into the manufacturing line to be operated. Advantageously, the entrance, passage and exit are situated in the same plane. When an entrance of a guideway of the distributing element is positioned next to the outlet of the supply line and, thus, the exit of this guideway is positioned next to the feed-in of a particular manufacturing line to be operated, closures can travel from the supply line directly via the guideway into the particular manufacturing line without further movement of the guideway. Through the displacement of the distributing element and, hence, the positioning of the entrance of another guideway next to the outlet of the supply line, and thus the exit next to another manufacturing line, this other manufacturing line can be filled. When the number of guideways is equal to the number of manufacturing lines, each guideway possesses a unique guide path with a view to allowing each manufacturing line to be operated. The closures can be introduced via the distributing element one by one into different manufacturing lines, though usually a plurality of closures, for example three or more, will be fed to a manufacturing line before the distributing element is displaced. Such an operation of the distributing device according to the invention allows a large number of closures to be processed and then to be distributed over the manufacturing lines. The distributing device according to the invention has a large capacity. For example, in an embodiment of a vertical distribution system having four guideways, a manufacturing capacity of more than 6500 closures per hour has proved possible.

The distributing element comprises no rotating distributing disc, which results in less wear, as well as lower maintenance and susceptibility to breakdown. This is of particular importance in environments in which the closures are used in the packing of food products.

The entrances of the guideways are disposed in a direction perpendicular to the longitudinal plane of the supply line. The direction of displacement of the distributing element is thus perpendicular to the base of the guideways. This base is parallel with the longitudinal plane of the supply line. Because the closures generally have a flat configuration, that is to say two principal faces with a narrow side edge in comparison with the principal surfaces, in the device according to the invention a displacement of the distributing element over somewhat more than the thickness of the closure (side edge thickness) is sufficient to pass from one guideway to the other guideway. In other words, the time which is required to push a guideway beneath the outlet of the supply line can be kept extremely short in comparison with the known systems, the distributing valve being moved to and fro in the longitudinal plane. This other configuration of the entrances of the guideways makes a positive contribution to the high capacity. The entrances of the guideways are situated on a line lying in the plane perpendicular to the said longitudinal plane of the supply line and perpendicular to the longitudinal centre line of the supply line. Expressed differently, the entrances are advantageously situated in a line perpendicular to the base of the supply line, assuming that the supply line, at least at the level of the outlet thereof, is composed of a bottom substantially parallel to a principal surface of the closure, and at least two vertical edges, generally parallel to the side edge of the closure. The exits of the guideways do not, of course, lie on a line, since the feed-ins of the manufacturing lines are arranged side by side in the same plane.

The guideways, which can be made of any chosen material, such as metal or plastic, can possess a guide path of any chosen shape, insofar as the transport of closures under the influence of gravity and/or drive medium so allows. Sharp corners and transitions are advantageously absent so as to limit the risk of blockages. The guideways can be constructed out of wire work, sieve material and/or solid material. The distributing element can also be made from a piece in which the guideways are fitted.

In a preferred embodiment of the distributing device according to the invention, the distributing element is composed of a number of distributing plates conforming to the number of manufacturing lines, as well as a closing plate, a recess being provided as a guideway in a surface of each distributing plate. In this preferred embodiment of a distributing element, a guideway is formed by a recess in a surface of a distributing plate, which recess, on the top side, is closed off by the non-recessed surface of a following distributing plate, etc. The recess in the form of a guideway in the last distributing plate is covered by the closing plate. A distributing element of this type, made up of separate distributing plates, is simple to produce, for example by mill-cutting of a guideway in a (metal) distributing plate.

The distributing element can be displaced with the aid of devices suitable for this purpose, for example electric motors, etc. Advantageously, the displacement mechanism is set up for the rectilinear displacement of the distributing element. In a preferred embodiment, the displacement mechanism comprises one or more piston/cylinder assemblies, preferably coupled piston/cylinder assemblies with different stroke lengths.

The invention also relates to an assembly of a distributing device according to the invention, as has been discussed above, a supply line for the successive supply of closures to the distributing device, and a plurality of manufacturing lines.

In order to prevent the closures, during the displacement of the distributing element of the distributing device, from getting jammed between the outlet of the supply line and the entrance of a guideway, the outlet of the supply line is provided with stop means for the arresting of closures. Examples of suitable stop means include fingers, which can be moved to and fro, and blowing means, which arrest the closures.

In a further embodiment of the assembly according to the invention, the supply line is provided with detection means for detecting the presence of closures in the supply line, and the assembly is further provided with a control mechanism for controlling the stop means on the basis of a signal emanating from the detection means. When (stationary) closures are detected in this portion of the supply line, the stop means are activated (with time lag, if so desired), so that the displacement mechanism can be switched on provided that there are no closures any longer present in the particular guideway. Advantageously, a manufacturing line is provided with detection means for detecting the presence of closures in the manufacturing line, and the control mechanism is likewise set up to control the displacement means on the basis of a signal emanating from the detection means. The control mechanism can comfortably absorb possible differences in take-up capacity of the manufacturing lines. The sensors detect which manufacturing lines need to be fed. The distributing device is controlled accordingly by the control mechanism on the basis of signals from the sensors. The distributing device does not therefore need to follow a fixed predetermined pattern. These detection means are preferably disposed close to the feed-in of the manufacturing line. When the detection means in the manufacturing line indicate (stationary) closures, the manufacturing line is full. The stop means in the supply line are then activated and any closures present in the distributing element are additionally dispensed into this manufacturing line. The displacement means are then activated, and once the entrance of another guideway, which feeds another manufacturing line, is positioned next to the outlet of the supply line, the stop means in the supply line can be deactivated and this manufacturing line can be filled/replenished.

BRIEF DESCRIPTION OF THE DRAWINGS

The invention is illustrated below with reference to the drawing, in which:

FIGS. 3-10 illustrate diagrammatically the distribution positions of the distributing device.

DETAILED DESCRIPTION OF PREFERRED EMBODIMENTS

Figure 1:
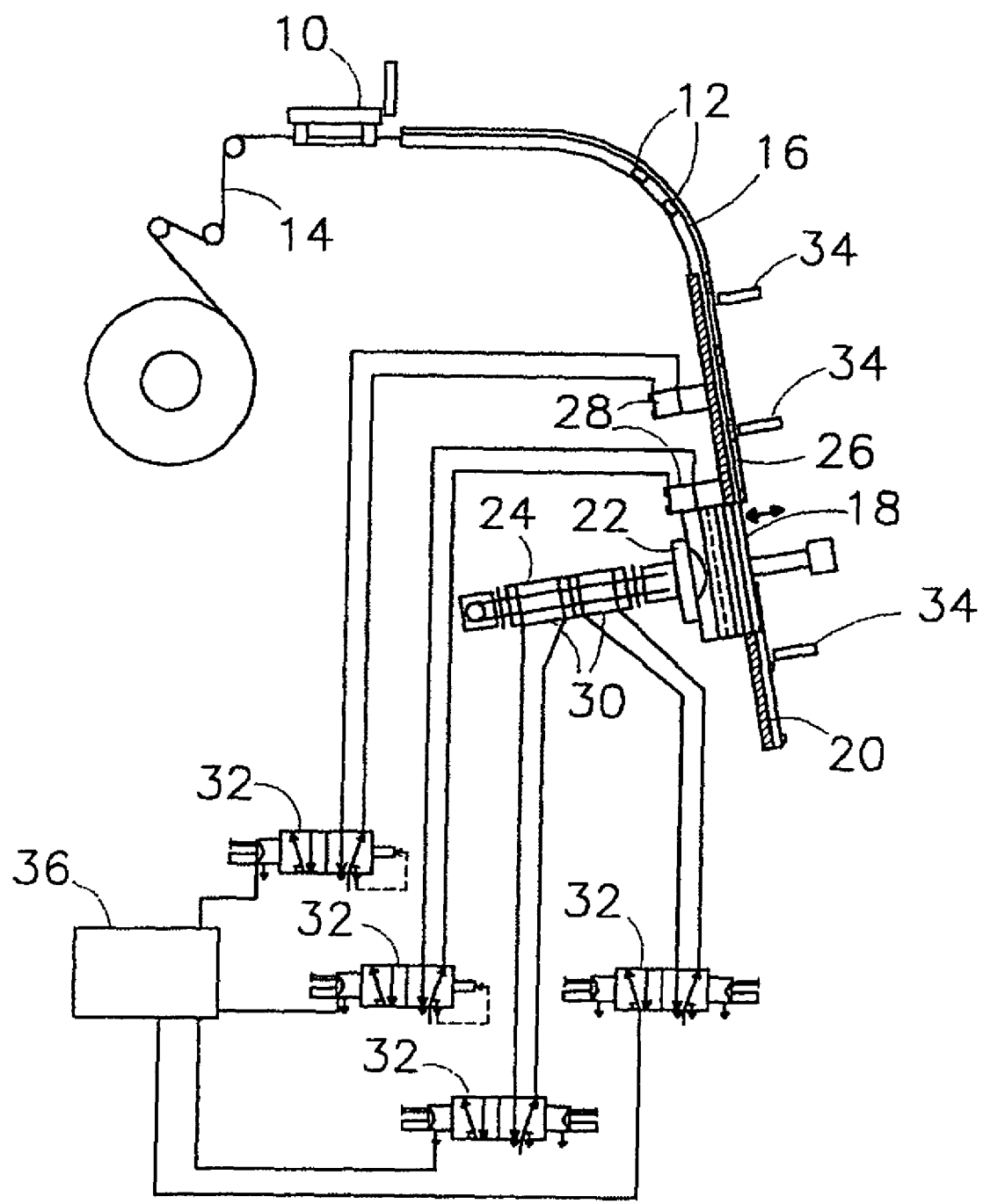
FIG. 1 is a diagrammatic side view of an embodiment of a distributing device according to the invention.

In FIG. 1, a press for punching closures 12 from a strip 14 of metal or plastic is indicated diagrammatically by reference numeral 10. The punched-out closures 12 are transported via a supply line 16, for example with the aid of air, to a distributing device 18 according to the invention. With the aid of the distributing device 18, the closures 12, supplied one behind the other via the supply line 16, are distributed under the influence of gravity over a number of manufacturing lines 20, only one of which is represented in FIG. 1. In this embodiment, the end of the supply line 16 and the manufacturing lines are situated in a virtually vertical plane. The distributing device 18 comprises a distributing element 22 and a displacement mechanism 24. The distributing element 22 can be moved to and fro, as indicated by a double arrow, in the plane of the drawing, i.e. perpendicular to the longitudinal plane 21 (see FIG. 2) of the supply line 16 and manufacturing lines 20. At the virtually vertical end close to the distributing device 18, the supply line 16 is provided with an outlet 26. Next to the outlet there are provided, diagrammatically represented, two sets of stop means 28, which together define a lock. In this embodiment, the displacement mechanism 24 comprises coupled piston/cylinder assemblies 30 having a different stroke length. The piston/cylinder assemblies 30, which in this embodiment are pneumatic, are driven in a manner which is known per se by drive mechanisms, likewise the stop means, which drive mechanisms are indicated diagrammatically in FIG. 1 by the reference numeral 32. Instead of piston/cylinder assemblies, motors such as a linear, electrically driven servomotor can also be used.

Presence sensors 34 are provided in the supply line 16 between the two sets of stop means 28, as well as in a position upstream thereof and in the manufacturing lines 20. A regulating device 36 controls the drive means 32, partly on the basis of signals emanating from the sensors 34.

Figure 2:
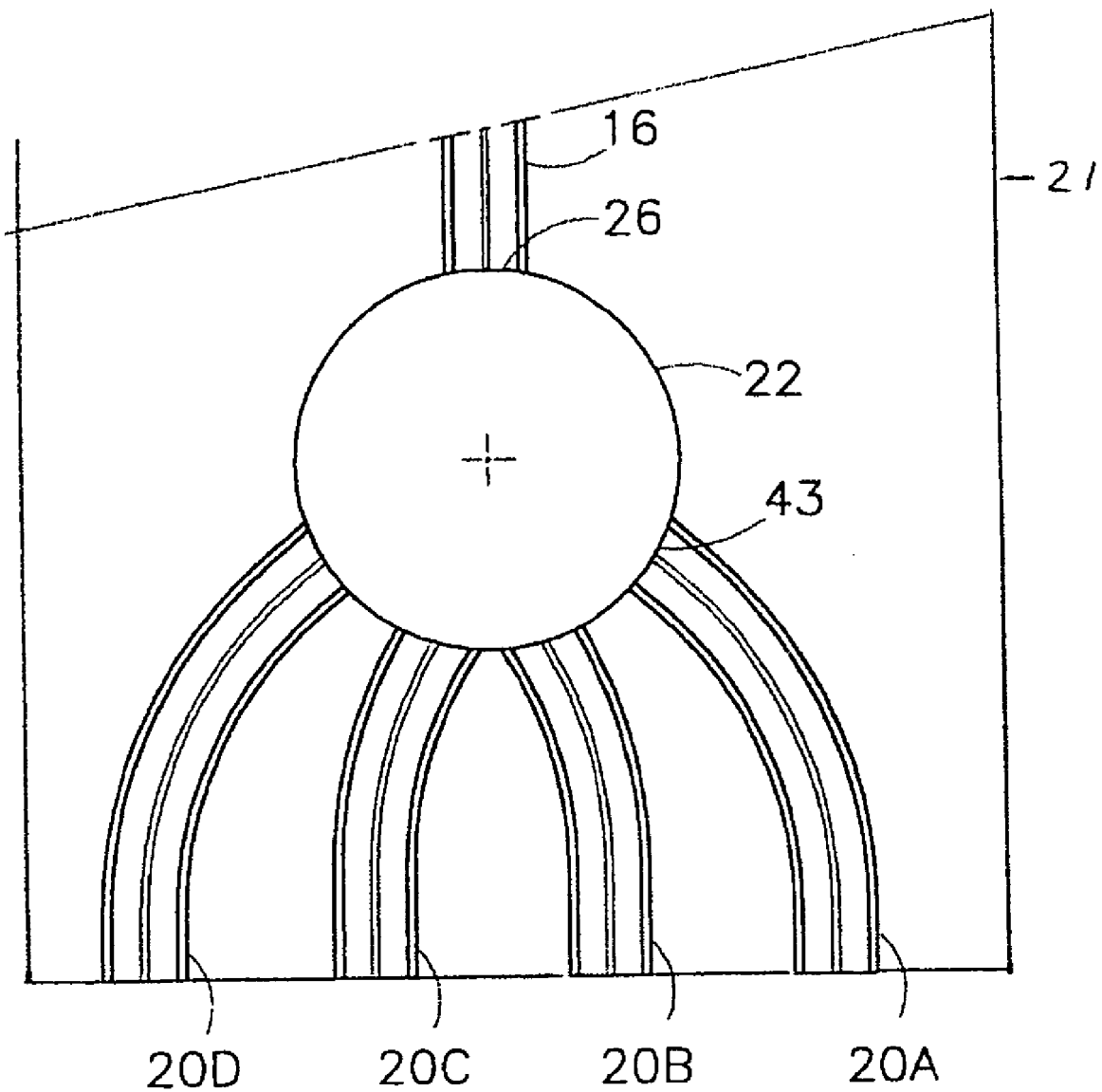
FIG. 2 is a diagrammatic front view of the distributing device according to FIG. 1.

FIG. 2 illustrates the distributing device 18 in relation to the supply line 16 and the manufacturing lines 20, in this case four in number, indicated by A-D, with feed-in 43.

FIGS. 3-10 illustrate the different positions of the piston/cylinder assemblies 30 of the displacement mechanism 24 for the distributing element 22, and the associated guideway. In the represented embodiment, the distributing element consists of four guide discs 40, in each disc 40 a guideway 42 (see FIG. 4) in the form of a recess of rectangular cross section being provided in a surface of the disc 40. The guideway 42 comprises an entrance 44, which in each disc 40 occupies the same position, a passage 46 and exit 48, which for each disc 40 are different. In other words, each guideway 42 in a disc 40 has a unique guide path. The guideway 42 in the form of a recess in the last disc is covered by means of a closing disc 50. Regarded in front view, the entrances 44 are disposed one behind the other, that is to say one behind the other in the direction of displacement of the distributing element 22. In this embodiment, the displacement mechanism 24 comprises two coupled piston/cylinder assemblies 30, indicated as 30A and 30B respectively, the stroke length of the first 30A amounting to twice that of the second 30B. It is thus possible to create four different feed-through positions of the distributing device. Below, the various components of the device which are in active use for a specific position are indicated by the particular reference numeral of the component, with the suffix A (position 0), B (position X), C (position 2X) and D (position 3X). In position 0, represented in FIGS. 3 and 4, both pistons of the assemblies 30A and 30B are retracted, so that the entrance 44A of the guideway 42A in the foremost disc 40A is located beneath the outlet 26 of the supply line 16. In this figure, the guideway 42 feeds the manufacturing line 20A positioned on the extreme right. FIGS. 5 and 6 illustrate disc position X in which the supply line 16 feeds closures to the second guideway 42B. This position of the distributing element 22 is set by extending the piston of the second piston/cylinder assembly 30B having the shortest stroke length. The disc position 2X represented in FIGS. 7 and 8 is set by fully extending the piston of assembly 30A and by fully retracting the second one. Finally, the last disc position 3X is set, according to FIGS. 9 and 10, with the pistons of both piston/cylinder assemblies 30A and 30B fully extended.

What is claimed is:

1. A distributing device comprising:
   a supply line with an outlet and a plurality of manufacturing lines, wherein the distributing device is adapted for distributing closures supplied from the supply line over the plurality of manufacturing lines, each manufacturing line comprising a feed-in, the feed-ins of the manufacturing lines being disposed side by side in a longitudinal plane,
   a distributing element comprising a number of guideways conforming at least to the number of manufacturing lines, wherein the distributing element can be displaced in a direction of displacement which is perpendicular to said longitudinal plane,
   each guideway comprising an entrance for the introduction of closures into the guideway, wherein the entrances of the guideways are disposed one behind the other in the direction of displacement of the distributing element, each guideway further comprising:
   an exit for the discharge of closures out of the guideway into the feed-in of the particular manufacturing line,
   a passage connecting the entrance to the exit, and a base parallel to the longitudinal plane and a displacement mechanism for displacing the guideways of the distributing element in the direction of displacement for the simultaneous positioning of an entrance of a specific guideway of the distributing element in line with the outlet of the supply line and, respectively, of an exit of the specific guideway in line with the feed-in of a manufacturing line.

2. The distributing device according to claim 1, wherein the distributing element further comprises a number of distributing plates conforming to the number of manufacturing lines, and a closing plate, wherein each distributing plate has a surface in which a recess is provided, wherein each recess forms one of the guideways.

3. The distributing device according to claim 1, wherein the displacement mechanism comprises one or more piston/cylinder assemblies.

4. The distributing device according to claim 3, wherein the displacement mechanism comprises coupled piston/cylinder assemblies with different stroke length.

5. An assembly of a distributing device according to claim 1, a supply line and a plurality of manufacturing lines, wherein the outlet of the supply line is provided with stop means for the arresting of closures.

6. The assembly according to claim 5, wherein the supply line is provided with detection means for detecting the presence of closures in the supply line, and the assembly is provided with a control mechanism for controlling the stop means on the basis of a signal emanating from the detection means.

7. The assembly according to claim 6, wherein a manufacturing line is provided with detection means for detecting the presence of closures in the manufacturing line, and the control mechanism is likewise set up to control the displacement mechanism on the basis of a signal emanating from the detection means.

8. The distributing device according to claim 1, wherein the displacement mechanism is set up for rectilinear displacement of the distributing element.

9. The distributing device according to claim 1, wherein the longitudinal plane is a vertical longitudinal plane and the distributing element is horizontally displaceable distributing element.

* * * * *